United States Patent [19]

Satoh

[11] Patent Number: 4,643,076
[45] Date of Patent: Feb. 17, 1987

[54] CONTROLLER FOR VALVE MECHANISM OF BRAKE BOOSTER

[75] Inventor: Satoru Satoh, Higashimatsuyama, Japan

[73] Assignee: Jidosha Kiki Co., Ltd., Tokyo, Japan

[21] Appl. No.: 776,091

[22] Filed: Sep. 16, 1985

Related U.S. Application Data

[62] Division of Ser. No. 252,702, Apr. 9, 1981, abandoned.

[30] Foreign Application Priority Data

Apr. 21, 1980 [JP] Japan .................. 55-52730

[51] Int. Cl.$^4$ ............................................. F15B 9/10
[52] U.S. Cl. ................................... 91/369 R; 91/376 R
[58] Field of Search ............. 91/369 A, 369 B, 369 R, 91/376 R, 369 C; 60/554, 547 R; 92/13.2, 13.6

[56] References Cited

U.S. PATENT DOCUMENTS

| | | | |
|---|---|---|---|
| 2,015,374 | 9/1935 | Baker | 92/13.2 X |
| 3,082,744 | 3/1963 | Gardner | 121/41 |
| 3,385,167 | 5/1968 | Wilson et al. | 91/369 A |
| 3,688,647 | 9/1972 | Kytta | 91/369 A |
| 3,937,021 | 2/1976 | Sisco et al. | 91/369 A |
| 4,033,131 | 7/1977 | Gardner | 91/369 A |
| 4,043,251 | 8/1977 | Ohmi | 91/369 A |
| 4,173,172 | 11/1979 | Ohmi | 91/369 A |
| 4,200,029 | 4/1980 | Ohmi | 91/369 A |
| 4,227,371 | 10/1980 | Takeuchi | 91/369 B |
| 4,257,312 | 3/1981 | Ohmi et al. | 91/369 A |
| 4,284,261 | 8/1981 | Benjamin et al. | 92/13.2 X |
| 4,287,811 | 9/1981 | Katagiri et al. | 91/369 A |
| 4,453,380 | 6/1984 | Meynier | 92/13.2 X |
| 4,469,009 | 9/1984 | Takayama et al. | 91/369 C |
| 4,475,444 | 10/1984 | Hendrickson | 91/369 C |

FOREIGN PATENT DOCUMENTS

| | | | |
|---|---|---|---|
| 2064690 | 5/1981 | United Kingdom | 91/369 A |
| 2065809 | 6/1981 | United Kingdom | 91/369 A |

*Primary Examiner*—Robert E. Garrett
*Assistant Examiner*—Mark A. Williamson
*Attorney, Agent, or Firm*—Flynn, Thiel, Boutell & Tanis

[57] ABSTRACT

A brake booster is provided in which a hydraulic pressure applied to a power piston is controlled by controlling a valve mechanism in response to a movement of an operating rod which is mechanically interlocked with a brake pedal. A valve plunger connected to the free end of the operating rod forms the valve mechanism, and is provided with a stop member, which limits a rear position of the valve plunger by abutment against the internal surface of a closed shell or a support mounted thereon when the brake booster is inoperative. As a consequence, the cross-sectional area of a flow path for the hydraulic fluid can be increased while maintaining an optimum depression of the brake pedal. Since such result is achieved by the stop member which is disposed within the closed shell, the arrangement can be constructed with a reduced weight and size as compared with a conventional arrangement in which the stop is disposed on the exterior of the shell.

9 Claims, 7 Drawing Figures

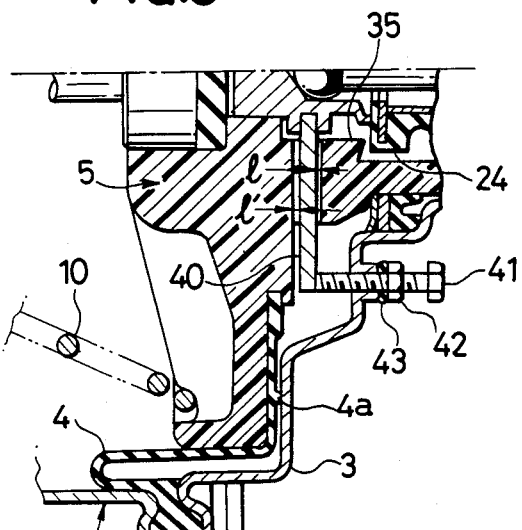
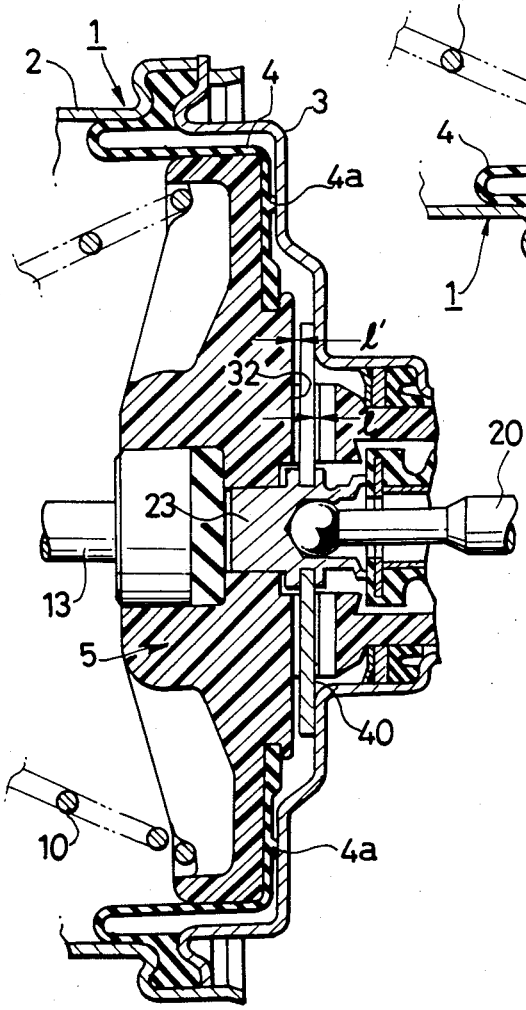

CONTROLLER FOR VALVE MECHANISM OF BRAKE BOOSTER

This application is a division of U.S. Ser. No. 252,702, filed Apr. 9, 1981, now abandoned.

BACKGROUND OF THE INVENTION

The invention relates to a controller for valve mechanism of a brake booster, and more particularly, to such controller capable of reducing a play or an ineffective stroke during a brake operation to thereby improve a brake feeling.

In a brake booster, the opening or closing of a valve mechanism is controlled by an operating rod which is mechanically interlocked with a brake pedal. During a brake operation, the atmospheric pressure is introduced into a rear power chamber to apply a pressure differential between the rear and the front power chamber to a power piston, thus obtaining a booster function. When the brake is released, the rear power chamber is interrupted from communication with the atmosphere and is brought into communication with the front power chamber, thus allowing the power piston to be returned to its inoperative position under the bias of a return spring. To improve the response of a brake booster, it is preferred to increase the cross-sectional area of a flow path between the rear power chamber and the atmosphere and between the both power chambers, or to increase the lift of the valve mechanism. However, when the lift of the valve mechanism is increased in order to achieve an increased area of the flow path between the both chambers, there results an increase in the play or ineffective stroke of a brake pedal which is required when the brake pedal is depressed from its inoperative condition to cause the valve mechanism to interrupt the communication between the both power chambers. In other words, the brake feeling is degraded.

To overcome this difficulty, there is known a controller for valve mechanism in which the operating rod is provided with a stop member so that during the time when the power piston is returning to its original inoperative position after the brake pedal is released from the brake operated position, the increased lift establishes an increased cross-sectional area until the power piston reaches its inoperative position, whereupon the stop member integral with the operating rod bears against a stop which is provided outside a closed shell to thereby prevent the operating rod from moving rearward freely, thus maintaining the operating rod at an advanced position relative to the power piston during the non-operated condition and thus maintaining a small lift.

However, in this arrangement, the stop member must be located on the operating rod on a portion thereof which projects out of the power piston and the stop which is provided for abutment against the stop member must be disposed on the exterior of the closed shell. This resulted in an increased size of the brake booster, defeating a compliance with the recent trend toward an arrangement of a reduced weight and size.

SUMMARY OF THE INVENTION

Therefore, it is an object of the invention to provide a brake booster which has a reduced weight and size while providing a satisfactory brake feeling by minimizing the play or ineffective stroke of a brake pedal.

Above object is achieved by a valve plunger connected to the free end of an operating rod and forming a valve mechanism and which is provided with a stop member disposed for abutment against the internal surface of a closed shell or a support mounted thereon to limit a rearward position of the valve plunger when the brake booster is inoperative.

It is another object of the invention to make the length of projection of the support into the closed shell adjustable, thereby facilitating an adjustment of the ineffective stroke of the brake pedal to substantially zero.

Other objects and advantages of the invention will become apparent from the following description with reference to the drawings.

BRIEF DESCRIPTION OF THE DRAWINGS

FIGS. 5, 6 and 7 are longitudinal sections of other embodiments of the invention.

DESCRIPTION OF EMBODIMENTS

Figure 1:
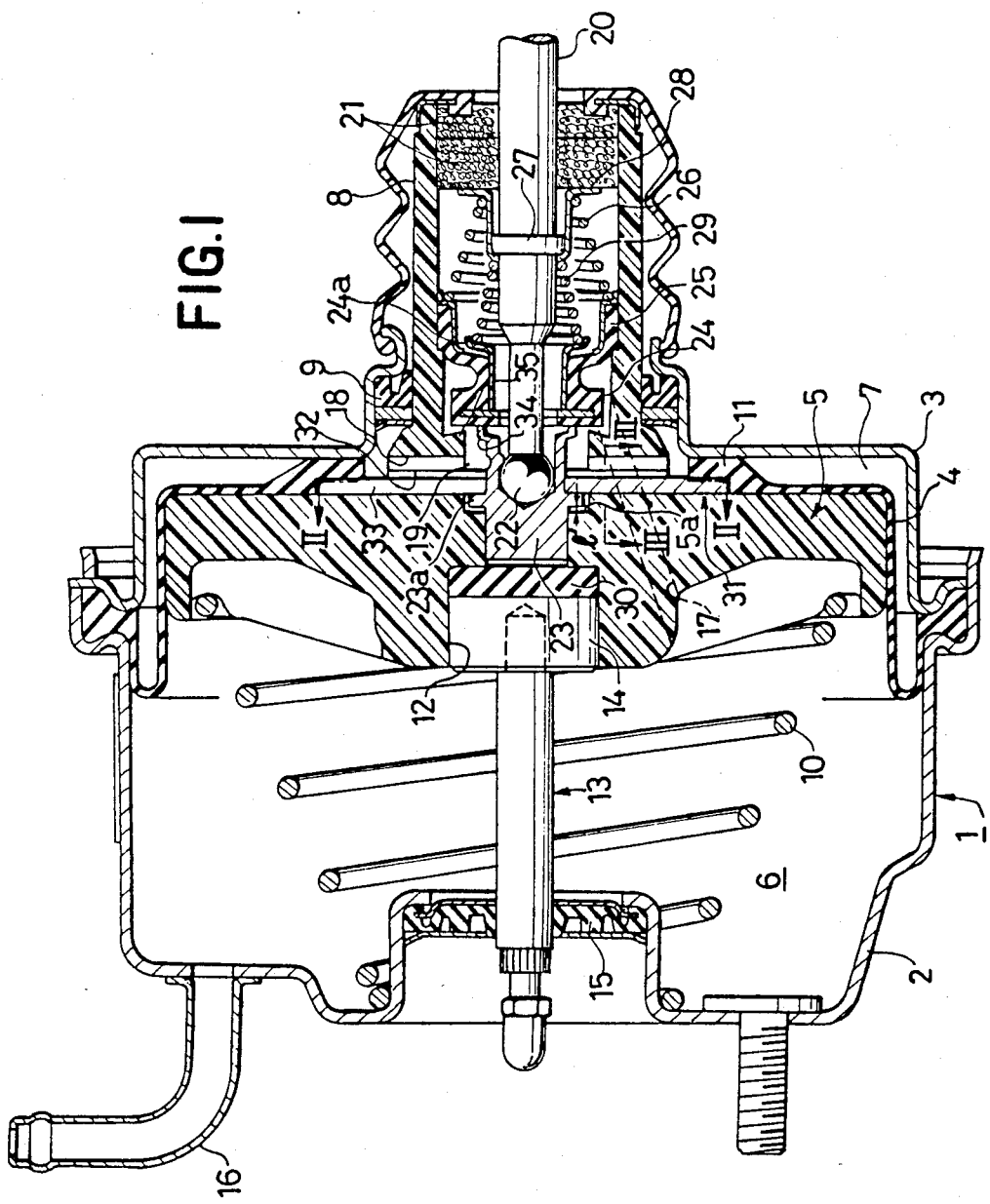
FIG. 1 is a longitudinal section of an embodiment of the invention.

Referring to the drawings, several embodiments of the invention will now be described. Referring initially to FIG. 1, there is shown a closed shell 1 formed by a front shell half 2 and a rear shell half 3 disposed in abutting relationship and with a diaphragm 4 held therebetween. A power piston 5 is disposed within the shell and has the inner peripheral edge of the diaphragm 4 secured to the periphery and the rear surface thereof. The combination of the piston and the diaphragm 4 divides the interior of the shell 1 into a front power chamber 6 and a rear power chamber 7. The piston includes a rearwardly extending cylindrical portion 8 which slidably extends through an opening formed in the rear shell half 3 with a seal 9 interposed between the cylindrical portion and the opening. A return spring 10 is disposed to extend between the front surface of the piston and an end wall of the front power 9, thus urging the piston 5 rearwardly until a bead 11, formed around the inner periphery of the diaphragm 4, bears against the rear shell half 3. An opening 12 is centrally formed in the front surface of the piston 5, and a driven rod 13 has a rear end 14 which is slidably fitted into the opening 12. The front end of the driven rod 13 extends through the end wall of the front power chamber 6 while being hermetically sealed by a seal 15 for transmitting an output to a master cylinder, not shown. A negative pressure tube 16 is connected to a source of negative pressure such as an air intake pipe of an engine or the like and has its other end opening into the end wall of the front power chamber 6. A communication path 17 extends through the piston 5 and opens into the inside of the cylindrical portion 8. Another communication path 18 is formed to provide a communication between the rear power chamber 7 and an internal chamber 19 which communicates with the opening 12.

An operating rod 20 extends into the cylindrical portion 8 through an air cleaner 21. The rod is inserted through the rear opening of the cylindrical portion, and its inner end is formed into a spherical configuration 22 around which the rear end of a valve plunger 23 is calked. The valve plunger 23 is slidably disposed within the internal chamber 19. While not shown, the rear end of the operating rod 20 is connected for movement with a brake pedal, not shown. A valve member 24 is disposed to surround the operating rod 20 at a location rearward of the spherical portion 22, and comprises a cylindrical plate covered with an elastic material such as rubber. It includes a rear end portion of an increased diameter 25 which is secured to the inside of the cylindrical portion 8 at an intermediate position thereof. A valve return spring 26 is disposed between an abutment 28 mounted on an intermediate flange 27 of the operating rod 20 and the rear end 25 of the valve member 24. A valve bias spring 29 is disposed between a rear step 24a of the valve member 24 and the leading edge of the abutment 28. A reaction disc 30 formed of a material such as rubber is fitted over the rear surface of the rear end 14 of the driven rod within the opening 12 at a small clearance from the valve plunger 23, and isolates the internal chamber 19 from the front power chamber 6.

Figure 2:
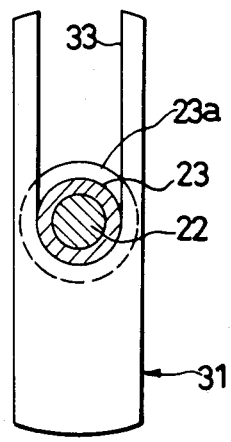
FIGS. 2 and 3 are cross sections taken along the lines II—II and III—III shown in FIG. 1.
Figure 3:
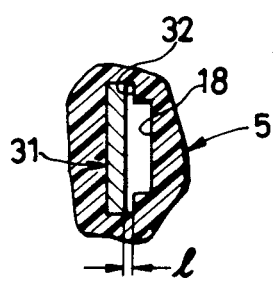

A stop member 31 in the form of a flat plate is inserted into an opening 32 which extends diametrically through the piston 5, and is formed with a U-shaped groove 33 therein, as indicated in FIG. 2, in which the valve plunger 23 is slidably received. The opposite ends of the stop member 31 project from the opening 32 and are connected with the bead 11 of the diaphragm 4 along their inner periphery. As shown in FIG. 3, the stop member 31 is disposed in the opening 32 in a manner such that the stop member can be displaced by an amount 1 in the axial direction of the power piston 5 within the opening 32.

When the brake booster is inoperative, the piston 5 is urged by the return spring 10 to assume its right-hand position shown in FIG. 1, whereby the bead 11 of the diaphragm 4 is resiliently abutting against the internal surface of the rear half 3. Under this condition, the stop member 31 connected to the bead 11 is resiliently urged against the front end face of the opening 32 and the rear surface of the piston 5 which is coplanar therewith, as shown in FIGS. 1 and 3. On the other hand, the valve plunger 23 is urged by the valve return spring 26 to the right, as viewed in FIG. 1, together with the operating rod 20, so that the stop 23a on the valve plunger 23 then assumes a position where it bears against the stop member 31. Under this condition, the valve member 24 is resiliently urged by the valve bias spring 29 against a valve seat 34 which is formed in the rear end of the valve plunger 23, thus completely interrupting a communication between the atmosphere side of a shank portion of the valve member 24 and the internal chamber 19 around the valve plunger 23. The valve member 24 is resiliently urged against a valve seat 35 formed in the power piston 5 or is located opposite thereto with a small clearance therebetween.

When the brake pedal is depressed under such inoperative condition to drive the operating rod 20 forward against the action of the valve return spring 26, the valve member 24 is driven into a full abutment against the valve seat 35 in a resilient manner, thus interrupting a communication between the communication path 17 and the internal chamber 19, or between the both power chambers 6 and 7. Subsequently as the valve seat 34 formed in the valve plunger 23 moves away from the front edge of the valve member 24 to admit the air into the rear power chamber 7 through the internal chamber 19 and the other communication path 18, the piston 5 is driven forward against the action of the return spring 10, thus causing the driven rod 13 to actuate the master cylinder to supply a braking liquid pressure thereto. The maximum lift of the valve mechanism is determined by the clearance l' between the stop 23a and a step 5a formed in the power piston 5 (see FIG. 1).

Figure 4:
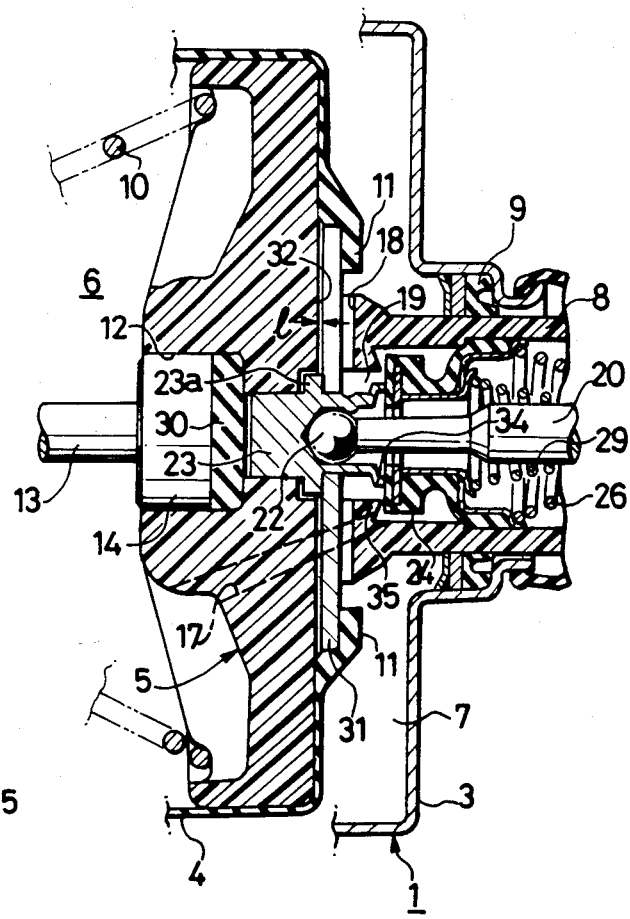
FIG. 4 is a longitudinal section of essential parts assuming different positions from those illustrated in FIG. 1.

When the brake pedal is released, the valve plunger 23 moves together with the operating rod 20 to the right relative to the piston 5 under the resilience of the valve return spring 26. As shown in FIG. 4, the stop 23a on the valve plunger 23 then moves into abutment against the stop member 31, resiliently urging the latter against the rear end face of the opening 32. Thereupon, the valve seat 34 of the valve plunger 23 bears against the valve member 24, interrupting a communication between the rear power chamber 7 and the atmosphere and causing the valve member 24 to move away from the valve seat 35 to establish a communication between the both power chambers 6, 7. In addition, the clearance between the valve member 24 and the valve seat 35 is increased by an amount corresponding to the stroke l within the opening 32 of the stop member 31, as compared with the inoperative condition of the brake booster. As a result, the rear power chamber 7 communicates with the front power chamber 6 through a flow path having an increased cross-sectional area, thus permitting the pressure within the rear chamber 7 to be reduced to the same pressure as that prevailing within the front chamber 6. Consequently, the piston 5 is rapidly returned to its original position under the resilience of the return spring 10.

Under the condition shown in FIG. 4, as the power piston 5 is urged to the right by the return spring 10 and the bead 11 of the diaphragm 4 is resiliently urged against the rear shell half 3, the stop member 31 ceases to move rearward while simultaneously causing a rearward movement of the valve plunger 23 to be stopped. On the other hand, the power piston 5 continues to move rearward until the front end face of the stop member 31 bears against the front end face of the opening 32 and the rear surface of the piston 5 before it comes to a stop, so that the clearance between the valve member 24 and the valve seat 35 is reduced by an amount l, as shown in FIG. 1. Under this condition, the valve member 24 is seated up against the valve seat 35 or opposes the latter with a small clearance therebetween. Accordingly, when the brake pedal is depressed again in order to operate the brake booster, the hydraulic circuit is immediately switched by the valve mechanism. In this manner, a satisfactory brake feeling is assured even though an increased lift is established between the valve member 24 and the valve seat 35 during the rearward movement of the piston 5.

While the stop member 31 is disposed to be slidable with respect to the valve plunger 23 in the embodiment described above, they may be formed integrally. Such an embodiment is shown in FIG. 5, where a stop member 40 is connected to the valve plunger 23 so as to be incapable of axial displacement therefrom. In the present embodiment, when the booster is inoperative, a valve return spring, not shown, causes the stop member 40, the valve plunger 23 and the operating rod 20 to remain stationary at locations where the stop member 40 is resiliently urged against the rear shell half 3 while the return spring 10 causes the piston 5 to remain stationary at a location where a projection 4a on the diaphragm 4 is resiliently urged against the rear shell half 3. Under this condition, the stop member 40 is located intermediate the length of the opening 32, with a clearance l' and a clearance l left forwardly and rearwardly thereof. Therefore, it will be evident that the same function is achieved in the present embodiment as mentioned previously.

It is possible to provide means for adjusting the magnitude of the clearance l when the arrangement of FIG. 5 is used. Such an embodiment is illustrated in FIG. 6 where a bolt 41 is threadably engaged with the rear shell half 3 at a given location and serves as a support. The stop member 40 is resiliently urged against the free end of the bolt. The bolt 41 is normally secured to the rear shell half 3 by a nut 42, with a seal 43 interposed therebetween. In this arrangement, by adjusting the length of projection of the bolt 41 relative to the piston 5 which is resiliently supported by the rear shell half 3, the stop position of the stop member 40 can be adjusted. This facilitates an adjustment of the play or ineffective stroke of the brake pedal to substantially zero through a fine adjustment of the clearance l or the relative position of the valve member 24 with respect to the valve seat 35.

Figure 7:
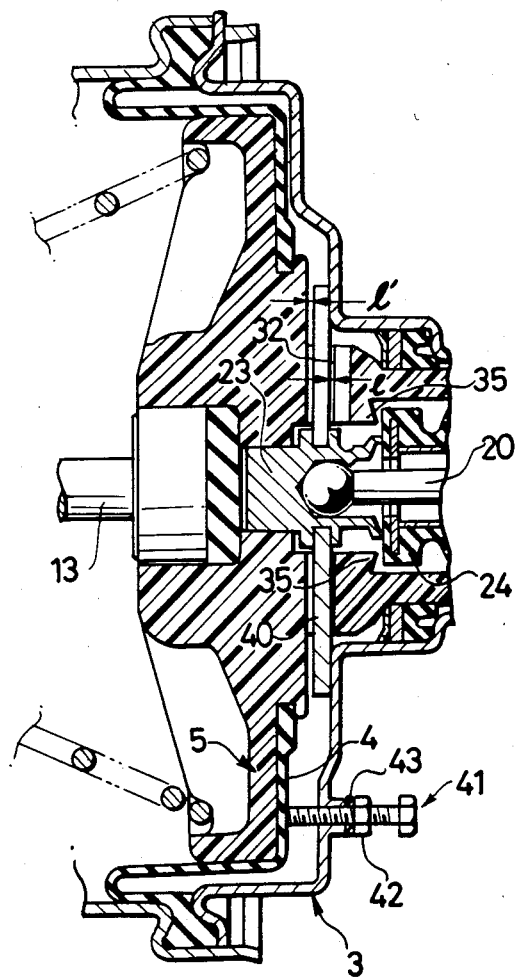

The adjusting means may be utilized to adjust a stop position of the piston 5. Such an embodiment is shown in FIG. 7. In this embodiment, by adjusting the length of projection of the bolt 41, a stop position of the piston 5 can be adjusted, thereby adjusting the relative position of the stop member 40 with respect to the opening 32. Obviously, an adjustment of the play or ineffective stroke of the brake pedal to substantially zero is possible.

While certain embodiments of the invention have been shown and described by way of illustration, it should be understood that a number of changes and modifications are possible without departing from the spirit and scope of the invention. Therefore it is intended that the invention is solely defined by the appended claims.

What is claimed is:

1. A brake booster of the type having an operating rod adapted to be mechanically interlocked with a brake pedal, a housing having a rear shell, a power piston movable in said housing toward said rear shell, and a valve mechanism for controlling a fluid pressure applied to said power piston in response to movement of said operating rod, wherein the valve mechanism comprises:

an opening formed in the power piston and a stop member movable in the opening through a limited distance in the axial direction of the power piston;

a valve plunger responsive to movement of the operation rod and valve means responsive to movement of said valve plunger for controlling the fluid pressure applied to said power piston, said valve means having a clearance, said valve plunger having an outer surface and an annular groove in said outer surface, the inner end of the stop member being engaged in the annular groove formed in the outer surface of the valve plunger, rearward movement of the valve plunger with respect to the power piston being limited by the stop member, the power piston having an inoperative position;

an adjustable abutment member provided on the rear shell and abutting one of the stop member and power piston in the inoperative position of the power piston for adjusting a clearance of said valve means.

2. A brake booster according to claim 1 including a diaphragm coupled to said power piston and dividing the space in said housing into front and rear power chambers located on opposite sides of said piston such that a fluid pressure differential can be created between said chambers to assist movement of said piston said operating rod having an outer end adapted to be connected to the brake pedal and having an inner end located inside said booster, said valve means including first valve means for regulating communication between said power chambers in response to movement of said operating rod, said valve plunger being connected to said inner end of said operating rod, said valve plunger including a head portion disposed within a recess in said power piston, said valve plunger defining second valve means for introducing an external pressure into said rear power chamber; said stop member being effective to establish a rearwardmost position of said valve plunger and said operating rod, such that as said power piston is being returned to the rearwardmost position said piston assumes when said booster is in the inoperative condition, said second valve means assumes a closed position whereby application of pressure into said rear power chamber is stopped, and said first valve means is opened to place said front and rear power chambers in communication with each other, then said first valve means assumes an approximately closed position; and means for effecting continued rearward movement of said piston over a small distance relative to said valve plunger and said operating rod, which remain stationary because said stopping member is in abutment with said stop means, thereby causing said first valve means to assume said approximately closed position.

3. A brake booster as claimed in claim 1, wherein said stop member is axially fixed with respect to said valve plunger such that said stop member is prevented from axial movement relative to said valve plunger.

4. A brake booster according to claim 1, wherein said adjustable abutment member comprises a bolt which is threadably engaged with said housing and has an interior end which extends into the interior of said housing, said bolt being positioned such that said stop member abuts against the interior end of said bolt when said stop member reaches its rearwardmost position.

5. A brake booster according to claim 1, in which said adjustable abutment member comprises a bolt which is threadably engaged with said housing and has an interior end which extends into the interior of said housing, said bolt being positioned such that said power piston abuts against the interior end of said bolt when said power piston is in its rearwardmost position.

6. A brake booster as claimed in claim 1, wherein said stop member is an elongate, substantially rectangular, flat plate having an elongated U-shaped groove disposed lengthwise therein allowing insertion of said plate onto said valve plunger from a direction transverse to the axis of said valve plunger.

7. A brake booster as claimed in claim 1, wherein said valve plunger has a pair of radially enlarged portions thereon, said stop plate being secured against axial movement between said radially enlarged portions on said valve plunger.

8. A brake booster according to claim 1, in which said stop member is a flat, elongated, substantially rectangular plate having a U-shaped groove in the inner end thereof, said valve plunger having radially enlarged portions thereon between which said stop member is axially fixed with respect to said valve plunger for axial movement with said valve plunger;

a fluid passage communicating between front and rear sides of said power piston, said valve means being disposed in said passage for closing same in response to forward motion of said valve plunger with respect to said power piston, means actuable for adjusting the extent of opening of said valve means with said power piston in the inoperative position, said means comprising said adjustable member;

said adjustable abutment member comprising a bolt extending through the rear wall of said housing and threadedly adjustable with respect thereto.

9. A brake booster as claimed in claim 1, in which said abutment member comprises an adjustable screw threaded sealingly through a wall of said enclosure such that one end of said screw protrudes rearward from the housing to permit adjustment of said clearance without disassembly of said booster.

* * * * *